United States Patent [19]

Takahashi et al.

[11] Patent Number: 4,539,600
[45] Date of Patent: Sep. 3, 1985

[54] IMAGE SIGNAL PROCESSING WITH A VARIABLE THRESHOLD

[75] Inventors: Shuichi Takahashi; Mitsuru Kondo, both of Sagamihara; Kazuhiro Yuasa, Zama, all of Japan

[73] Assignee: Ricoh Company, Ltd., Japan

[21] Appl. No.: 297,201

[22] Filed: Aug. 28, 1981

[30] Foreign Application Priority Data

Sep. 4, 1980 [JP] Japan ................................ 55-122853

[51] Int. Cl.³ ........................... G06K 9/00; H04N 1/40
[52] U.S. Cl. ..................................... 358/282; 382/53; 382/50; 340/347 CC; 340/347 M
[58] Field of Search .... 340/347 M, 347 DA, 347 CC; 358/282, 171; 330/11; 382/50-53

[56] References Cited
PUBLICATIONS

The Engineering Staff of Analog Devices, Inc., Analog–Digital Conversion Handbook, 6/1972, pp. I-32 to I-35; I-52 to I-63; II-32 to II-39; and III-73 to III-81.

Primary Examiner—T. J. Sloyan
Attorney, Agent, or Firm—Guy W. Shoup

[57] ABSTRACT

An image signal processing apparatus particularly suitable for use in a facsimile system for converting an analog image signal obtained by photoelectrically reading an original into a binary image signal for further processing is provided. The present image signal processing apparatus comprises a digital-to-analog converter and a digital data input unit, preferably a microcomputer, connected to the converter. Thus, the level of the reference voltage to be supplied to the comparator for converting the analog image signal into the binary image signal may be finely adjusted appropriately without complication in structure.

7 Claims, 5 Drawing Figures

IMAGE SIGNAL PROCESSING WITH A VARIABLE THRESHOLD

BACKGROUND OF THE INVENTION

1. Field of the Invention

This invention relates to an image signal processing apparatus for use in a system such as facsimile and in particular to an image signal processing apparatus for converting an analog image signal obtained by reading an original into a binary image signal for further processing such as transmission to a remote place.

2. Description of the Prior Art

An image signal processing apparatus for converting an analog image signal into a binary image signal has been well known and the structure of such a typical prior art apparatus is schematically illustrated in FIG. 1. As shown, the prior art apparatus comprises an amplifier 1, to the positive input terminal of which is supplied an analog image signal as obtained by reading an original, a capacitor 2 for holding the peak value of the analog image signal amplified by the amplifier 1, a voltage divider comprised of resistors 3 and 4, and a comparator 5 which compares the reference voltage from the voltage divider with the analog image signal and supplies a binary image signal "1" or "0" when the level of the analog image signal exceeds that of the reference voltage.

The output of the voltage divider, or the reference voltage, is determined to the value which is a fraction of the analog image signal level according to the resistance values of the resistors 3 and 4. Thus, the reference voltage varies in proportion to the peak value of the analog image signal. It should, however, be noted that the contrast between the background and image areas varies from original to original. Therefore, if the reference voltage is fixed at a constant proportionate value in relation to the level of the analog image signal as in the prior art apparatus, it often happens that the converted binary image signal is replete with noise or misses some information.

In other words, an original may have a small contrast between the white and black levels in the analog image signal as shown in FIG. 2a; whereas, another original may have a large contrast as shown in FIG. 2b. Suppose that the peak level is the same for the analog image signals shown in FIGS. 2a and 2b. Then, the reference, or threshold, level is the same for the signals shown in FIGS. 2a and 2b as indicated by the dashed line. Under the circumstances, in the case of the analog image signal shown in FIG. 2a, some information will be lost when converted into the binary image signal. If the reference level is raised closer to the peak level, it is true that more information may be picked up, however, in the case of the original having a larger contrast between the white and black levels as shown in FIG. 2b, black level information becomes predominant in the converted binary image signal, resulting in the production of "crushing" or widening of the lines of reproduced characters or diagrams.

In accordance with one approach which has been proposed to cope with the above-mentioned problem, one or both of the resistors 3 and 4, forming together a voltage divider, should be made variable. With such a structure, the proportion of the reference level to the level of the analog image signal may be adjusted appropriately in theory. However, it is quite impractical because such adjustments must be manually carried out for each original and the resistors are mounted on the printed circuit board which is usually located in the interior of the apparatus, providing only a limited accessibility. As a solution to this impracticality, the variable resistors 3 and 4 may be mounted on the control panel for easy handling by the operator. This again brings about another problem because extended leads are required for interconnections with the capacitor 2 and the comparator 5, which could make the reference voltage fluctuate when influenced by the increased stray capacitances and increase the possibility of introduction of noises, bringing about deterioration of the quality of a reproduced image.

There has been proposed another approach which adjusts the reference voltage from the control panel with ease in accordance with the condition of an original without the use of the extended interconnections. One example of this approach is shown in FIG. 3 wherein four resistors $7_1$ through $7_4$ are connected in series to form a voltage divider and each junction between adjacent resistors is connected to the comparator 5 through a relay unit 9, including normally open relays, $9_1$ and $9_3$ and a normally closed relay $9_2$. A switch unit 8 including two switches $8_1$ and $8_2$ is connected to the relay unit 9. The switch unit 8 is mounted on the control panel and the individual swithches $8_1$ and $8_2$ may be operated by the operator at the control panel. When all of the switches $8_1$ and $8_2$ are off, only the normally closed relay $9_2$ is on, and, therefore, the reference voltage appearing at the junction between the resistors $7_2$ and $7_3$ is supplied to the comparator 5. When the switch $8_1$ is closed, the normally closed relay $9_2$ is turned off and the normally open relay $9_1$ is turned on so that the higher reference voltage appearing at the junction between the resistors $7_1$ and $7_2$ is supplied to the comparator 5. On the other hand, when the switch $8_2$ is closed, the normally closed relay $9_2$ is turned off and the normally open relay $9_3$ is turned on, whereby the lower reference voltage at the junction between the resistors $7_3$ and $7_4$ is supplied to the comparator 5.

Accordingly, it is now possible to selectively supply an appropriate reference voltage to the comparator 5 by operating the switch unit 8 in accordance with the contrast between the background area and the image area of an original and the kind of an original. For example, if an original has a high-density information such as a newspaper, the switch $8_2$ must be turned on since there is a chance of causing "crushing" phenomenon in a reproduced image. On the other hand, if an original has a low-density information such as a diagram, the switch $8_1$ must be turned on. For an original with an average-density information, both of the switches $8_1$ and $8_2$ must be turned off. If there is discoloration in the background area, lowering the contrast between the background and image areas, the switch $8_1$ must be turned on or closed. With such a structure, the reference voltage may be easily adjusted from outside of an image sensing device such as in a facsimile system, thereby allowing a reproduced image of high quality.

It is to be noted, however, that the image signal processing device of FIG. 3 is not free from disadvantages. That is, if it is desired to carry out fine adjustments in response to the contrast between the background and image areas and/or to an increased number of types of originals, an unacceptably increased number of switches and control lines, connecting the switches to the relays, must be provided. This tends to make the apparatus bulky and expensive. Moreover, the increased number of components and wiring contributes to the occurrence of malfunctioning.

SUMMARY OF THE INVENTION

This invention overcomes the shortcomings of prior art image signal processing apparatuses and provides an image signal processing apparatus which is capable of finely adjusting the reference voltage without requiring complication in structure. The advantages of the present invention are preferably attained by providing a digital-to-analog, or D/A, converter for supplying the variable reference, or threshold, voltage to the comparator for comparison with an analog image signal in producing a binary image signal. In a preferred form of the present invention, an image signal processing apparatus comprises a capacitor for holding the peak value of an analog image signal obtained by photoelectrically reading an original, a D/A converter for receiving the voltage of said capacitor as an output level control input, means for supplying digital data to said D/A converter, and comparator means for converting said analog image signal into a binary image signal by using the output signal from said D/A converter as a reference voltage.

Therefore, it is an object of the present invention to provide an improved image signal processing apparatus.

Another object of the present invention is to provide an image signal processing apparatus which is capable of converting an analog image signal into a binary image signal in accordance with the condition of an individual original without losing image information.

A further object of the present invention is to provide an improved image signal processing apparatus for use in a facsimile system, which is simple in structure and easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
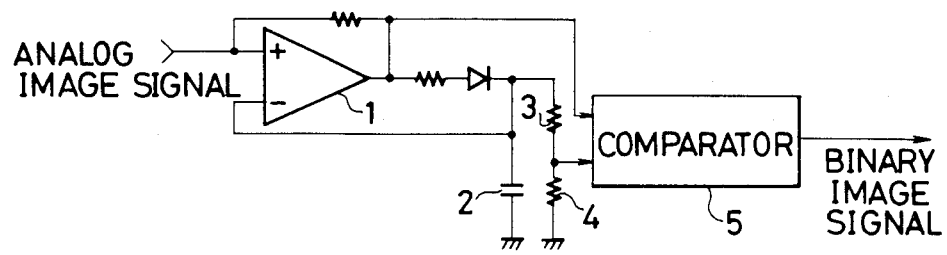
FIG. 1 is a schematic diagram of a prior art image signal processing apparatus.
Figure 2A:
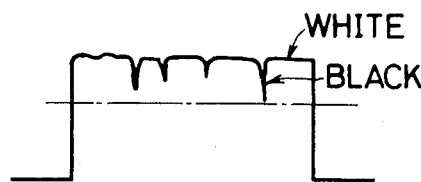
FIGS. 2a and 2b are wave-form diagrams showing exemplary analog image signals to be converted into binary image signals.
Figure 2B:
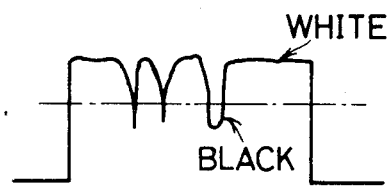
Figure 3:
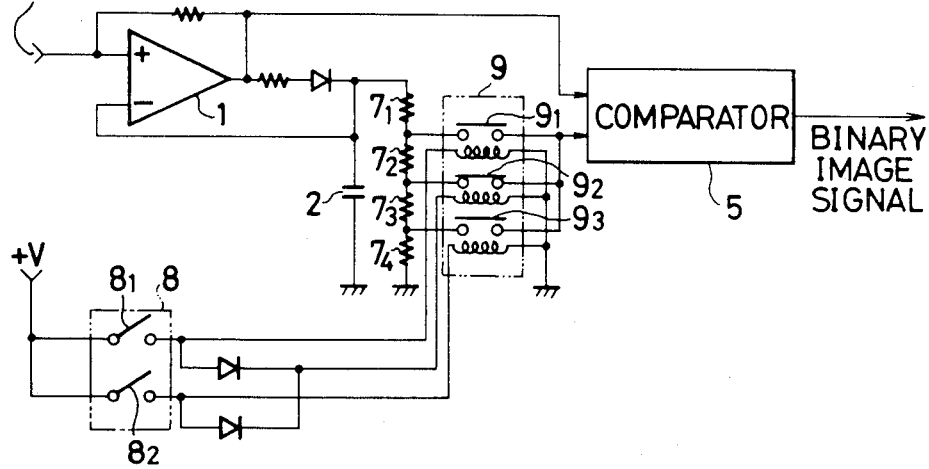
FIG. 3 is a schematic diagram showing the structure of another prior art image signal processing apparatus.
Figure 4:
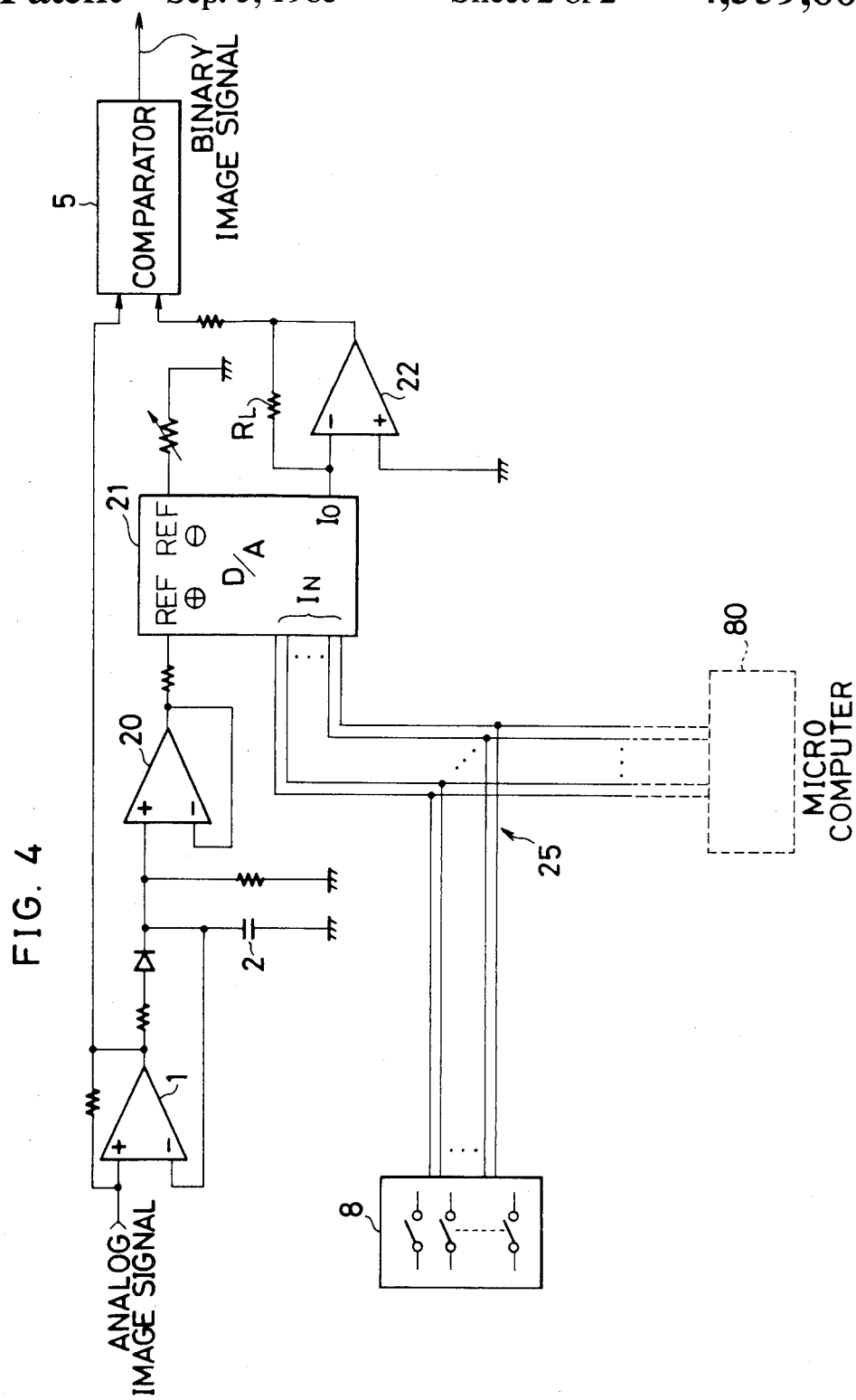
FIG. 4 is a schematic diagram showing one embodiment of the image signal processing apparatus in accordance with the present invention.

Referring now to FIG. 4, wherein like numerals indicate like elements shown in the previous figures, there is shown an image signal processing apparatus for converting an analog image signal obtained by photoelectrically reading an original into a binary image signal for further processing, which includes a buffer amplifier 20, a digital-to-analog converter 21 and an operational amplifier 22, which forms a current-to-voltage converter together with a resistor $R_L$.

The buffer amplifier 20 is a voltage follower circuit formed by an operational amplifier for impedance transformation and it may be omitted depending on the kind of the D/A converter 21 used. For the D/A converter 21, use may be generally made of any commercially available D/A converter which is small-sized and inexpensive. Since D/A converters are of the current output type in many cases, the current-to-voltage converter formed by the operational amplifier 22 and the resistor $R_L$ is inserted between the D/A converter and the comparator 5. Depending on the kind of the D/A converter used, such a current-to-voltage converter may be omitted.

If the output of the D/A converter 21 supplied to the amplifier 22 is comprised of an eight-bit binary code, then the level of the D/A converter output, namely the output level of the current-to-voltage converter, may be varied in $2^8$, or 256, different steps. Accordingly, the level of the reference voltage to be supplied to the comparator 5 may be selected from 256 different values, allowing to carry out fine adjustments in setting the level of the reference voltage. To the reference voltage terminal REF $\oplus$ of the D/A converter 21 is supplied the output voltage from the capacitor 2 which samples and holds the peak value of an image signal. And, the output level of the D/A converter 21 varies in accordance with the input level supplied to the reference voltage terminal REF $\oplus$. That is, even if the digital data supplied from the switch unit 8 to the D/A converter 21 are the same, the output voltage from the D/A converter 21 may differ in accordance with the level of the peak value appearing in the input image signal.

The digital data are formed by the switch unit 8 by the operator and they are supplied to the digital data input terminals $I_N$ of the D/A converter 21 through leads 25. The digital data determine the level of the reference voltage to be supplied to the comparator 5. It is to be noted that the digital data may also be supplied to terminals $I_N$ from an external or remote data source such as a microcomputer 80. For example, use may be made of a microcomputer 80 to obtain the most appropriate reference or threshold voltage for converting an analog image signal into a binary image signal in accordance with the condition of an original to be processed such as a contrast between the background and image areas. The thus obtained reference voltage expressed in digital format may be directly fed to the input terminals $I_N$ of the D/A converter 21.

When transmitting a half tone original such as a photographic picture by means of a digital facsimile or the like, the so-called "Dither" method is usually used. The present apparatus may be applied as an image signal processing circuit to such method. Since the reference voltage may be appropriately and finely adjusted, randomly if desired, by changing the eight-bit binary coded input digital data to the D/A converter 21, the image signal processing in accordance with the "Dither" method may be easily carried out. Besides, it should be noted that the D/A converter 21 may be substituted with a resistor network, which is generally referred to as a ladder resistor network such as a R, 2R ladder, or a R, 2R, 4R, . . . ladder.

As described above, since the present invention proposes to provide an image signal processing apparatus which comprises a D/A converter, the level of the reference voltage may be finely adjusted with a simple structure without requiring an unacceptably increased number of switches and control lines. Furthermore, adjustment of the level of the reference voltage can be carried out remotely from the control panel by the operator without causing deterioration in the quality of a reproduced image. It should further be understood that when use is made of a commercially available D/A converter, it can easily be interfaced with a microcomputer which can carry out a complicated control.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An image signal processing apparatus for converting an analog image signal obtained by photoelectrically reading an original into a binary image signal for further processing comprising:
sample and hold means for sampling and holding the peak value of said analog image signal;
digital-to-analog converting means having a reference input and a set of digital inputs, said reference input being connected to receive an output voltage from said sample and hold means;
input means connected to the set of digital inputs of said digital-to-analog converting means for determining the level of the output of said digital-to-analog converting means in association with the voltage supplied to said digital-to-analog converting means from said sample and hold means; and
comparator means for converting said analog image signal into a binary image signal by using the output from said digital-to-analog converting means as a reference voltage.

2. The apparatus of claim 1 further comprising buffer amplifier means connected between said sample and hold means and said digital-to-analog converting means.

3. The apparatus of claim 1 further comprising current-to-voltage converting means connected between said digital-to-analog converting means and said comparator means.

4. The apparatus of claim 3 wherein said current-to-voltage converting means includes an operational amplifier and a resistor.

5. The apparatus of claim 1 wherein said sample and hold means includes a capacitor one end of which is connected to receive said analog image signal with the other end grounded.

6. The apparatus of claim 1 wherein said input means comprises a plurality of switches which are manually operated by the operator.

7. The apparatus of claim 1 wherein said input means comprises a microcomputer.

* * * * *